United States Patent

[11] 3,616,190

| [72] | Inventor | Fred B. Shaw<br>Hinsdale, Ill. |
|---|---|---|
| [21] | Appl. No. | 20,447 |
| [22] | Filed | Mar. 23, 1970 |
| [45] | Patented | Oct. 26, 1971 |
| [73] | Assignee | Continental Can Company, Inc.<br>New York, N.Y.<br>Continuation of application Ser. No.<br>609,453, Jan. 16, 1967, now abandoned. |

[54] LAMINATED HEAT-SEALABLE SHEET HAVING ALUMINUM ADHERED TO A VINYL-CHLORIDE-COATED REGENERATED CELLULOSE SHEET
5 Claims, 2 Drawing Figs.

[52] U.S. Cl................................................... 161/190,
161/216, 161/249, 161/251, 161/252, 161/254,
161/256, 161/265, 206/46, 229/3.5
[51] Int. Cl................................................... B32b 15/20,
B32b 27/08, B32b 27/40
[50] Field of Search............................................. 161/256,
254, 220, 251, 190, 247, 252, 265, 216, 249;
229/3.5 MF

[56] References Cited
UNITED STATES PATENTS

| 2,568,463 | 9/1951 | Reynolds.................... | 156/152 |
| 3,023,126 | 2/1962 | Underwood et al. ......... | 161/190 X |
| 3,075,864 | 1/1963 | Anderson..................... | 161/247 X |
| 3,144,377 | 8/1964 | Eastes .......................... | 161/249 |
| 3,297,518 | 1/1967 | Maschner et al. ............ | 161/184 |
| 3,343,663 | 9/1967 | Seidler ......................... | 161/216 |
| 3,373,915 | 3/1968 | Anderson et al............. | 161/216 X |

FOREIGN PATENTS

| 893,311 | 4/1962 | Great Britain................ | 161/251 |
| 1,275,166 | 9/1961 | France ......................... | 161/254 |

*Primary Examiner*—John T. Goolkasian
*Assistant Examiner*—C. B. Cosby
*Attorneys*—Paul Shapiro, Joseph E. Kerwin and William A. Dittmann ABSTRACT: A laminated heat-sealable sheet is constructed of a plurality of plies of flexible films wherein the first ply is aluminum foil, the second ply is a polyolefin resin bonded to one face of the aluminum foil, the third ply is a heat-sealable thermoplastic resin bonded to the other face of the aluminum foil, and the fourth ply is polyvinylchloride-coated regenerated cellulose bonded to the polyolefin ply with a polyurethane resin primer.

PATENTED OCT 26 1971 3,616,190
Fig. 1.
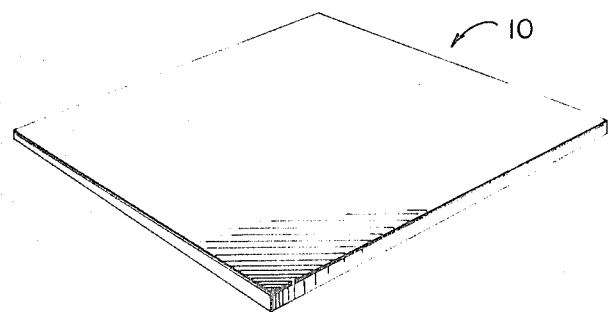
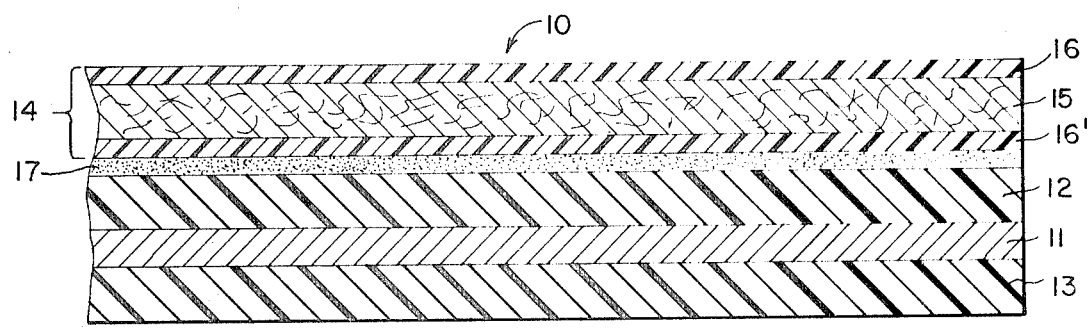
Fig. 2.
INVENTOR
FRED B. SHAW
BY Paul Shapiro
ATT'Y.

LAMINATED HEAT-SEALABLE SHEET HAVING ALUMINUM ADHERED TO A VINYL-CHLORIDE-COATED REGENERATED CELLULOSE SHEET

This is a continuation of Ser. No. 609,453 filed Jan. 16, 1967, now abandoned.

BACKGROUND OF INVENTION

1. Field of Invention

The present invention relates to laminated films and more particularly to an improved flexible laminated film wrapper for packaging a variety of products.

2. The Prior Art

Flexible walled pouches or containers have been used with excellent results and to an increasing extent in the packaging art for preserving and distributing foodstuffs and other materials of various character. These packages are generally constituted of flexible thermoplastic materials such as polyolefin resin films, as polyethylene and the like, which are laminated to metal foil. Flexible packages are formed from the laminated sheets by means of heat-sealing operations.

As it is highly desirable to have the outside of the packages be constituted of a very decorative film, a coated, transparent regenerated cellulose sheeting (or cellophane) having a design printed in reverse on the inner side of the sheet, is generally bonded to the polyolefin layer of the flexible laminated sheet with the printed design in contact therewith. The resulting composite article has wide market appeal because of its attractive appearance, outstanding barrier properties, compatibility with a large variety of products, and moderate cost.

However, considerable difficulty has been encountered heretofore in producing a satisfactory stable laminated product. As cellophane sheeting and polyolefin films are dissimilar materials, there is a lack of adequate adhesion. The problem is further aggravated by the printing ink used for the reverse design which ofttimes deleteriously affects any adhesive bond between the cellophane film and the polyolefin substrate. As a result, during subsequent handling of the package and especially during prolonged storage periods, delamination between the cellophane and polyolefin layers of the sheet occurs, resulting in package failure.

SUMMARY OF THE INVENTION

In accordance with the present invention, a laminated sheet suitable for use as a flexible packaging material having improved resistance to delamination is constructed of a first ply of aluminum foil, a second ply of a polyolefin resin bonded to one face of the aluminum foil, and a third ply of a heat-sealable thermoplastic resin bonded to the opposite face of the aluminum foil, and a fourth ply of regenerated cellulose coated on both sides with polyvinylchloride, the polyvinylchloride-coated cellophane ply adhesively bonded to the polyolefin substrate with a polyurethane resin primer. Suitably, the side of the cellophane bonded to the polyolefin substrate is provided, before bonding, with a decorative reverse-printed design.

Now referring more particularly to the drawings,

FIG. 1 perspectively depicts a laminated structure in accordance with the present invention.

FIG. 2 illustrates the laminated structure of FIG. 1 in fragmentary cross section.

With reference to FIGS. 1 and 2, there is illustrated the laminated structures of the present invention generally designated by the reference numeral 10. The laminated sheet 10 has a first layer 11 of aluminum foil of suitable thickness. To provide adequate dimensional stability and optimum barrier properties for the laminated sheet to be used as a packaging material, it is desirable that the aluminum foil layer 11 have a thickness ranging from about 0.0002 to 0.0006 inch, and preferably about 0.0004 inch in thickness, although any other thickness of foil may be considered suitable, depending upon conditions.

To one side of the aluminum foil is bonded a coextensive layer 12 of a polyolefin. The polyolefin layer 12 may be any of a variety of types, e.g., a resinous polyethylene having a melt index between about 3.0 to about 10.0 and a density between 0.90 and 0.970 g./cc. Preferably, a polyethylene resin having a melt index in the range of about 3.0 to 4.0 and a density in the range of about 0.91 to 0.95 g./cc may be used.

Other polyolefins which may be used include polypropylene and copolymers of ethylene with minor amounts of other unsaturated monomers such as vinyl and acrylic esters, such as methyl or ethyl acrylate or vinyl acetate.

To the other surface of the aluminum foil is bonded a coextensive layer 13 of a heat-sealable thermoplastic material. Suitable heat-sealable thermoplastic materials useful in the practice of the present invention include polyvinylidene chloride (Saran) and copolymers thereof with vinyl chloride or vinyl acetate, polystyrene, polyamides of the type formed by the reaction of a polybasic acid, preferably a dibasic acid, with a polyamine, preferably a diamine (Nylon), polyethylene, polypropylene, polyolefin copolymers, styrene-isobutylene copolymers, styrene-acrylonitrile copolymer, polyvinylchloride, vinyl chloride-vinyl acetate copolymers and the like.

The polyolefin layer 12 is applied by conventional melt extrusion procedure. The heat-sealable thermoplastic resin layer 13 may be applied to the surface of the aluminum foil 11 by melt extrusion, or from a lacquer or emulsion of the polymeric material. In the case of polyolefin materials, it is preferable to apply the coating by conventional melt extrusion procedures.

The thickness of the heat-sealable thermoplastic resin layer 13 may range from about 0.0005 to about 0.0050 inch, and preferably about 0.002 inch, and the polyolefin layer 12 from 0.0005 to 0.002 inch and preferably about 0.0008 inch.

To the polyolefin layer 12 is bonded a coated transparent regenerated cellulose sheet or cellophane 14 which is comprised of a regenerated cellulose layer 15 coated on opposite sides with a thin coating of polyvinylchloride 16, 16'.

The coated cellophane sheet 14 may be of any suitable thickness which has sufficient strength to withstand the stresses applied to the wrapper during use. Cellophane film ranging in thickness from 0.8 to 1.4 mils has been found to have a suitable strength.

The thickness of the polyvinylchloride coating ranges from about 5 percent to about 20 percent of the thickness of the cellophane film.

The polyvinylchloride coated cellophane sheet 14 is bonded to the polyolefin layer 12 by an intermediate layer of a polyurethane primer.

Polyurethane-bonding primers are well known to the art and are generally prepared from the reaction of the polyisocyanate with compounds containing reactive hydrogens, such as polyethers, polyesters, castor oils, amines, and the like. The primer, a solution of the polyurethane forming materials mixed with a suitable catalyst in a volatile solvent is applied to the cellophane surface which is to contact the polyolefin layer.

In adhering the coated cellophane film 14 to the polyolefin layer 12 the cellophane face to be adhered to the polyolefin substrate may be reverse printed with a suitable decorative design prior to the priming operation.

Many types of commercially available printing inks that are normally employed for printing coated regenerated cellulose have been found unsuitable for use in the laminated structure of the present invention as these inks deleteriously affect the bond between the coated cellophane and polyolefin layer. Inks which have been found to be especially useful for printing a decorative design on the coated cellophane layer which is bonded to the polyolefin layer in the laminated structure of the present invention without seriously affecting the resistance of the structure to delamination are those wherein the resin vehicle in the formulation is of a vinyl resin, an acrylic resin, cellulose acetate butyrate resin blend, or a polyamide-mitrocellulose blend.

The following examples will further illustrate the invention, but the invention is not restricted to these examples.

EXAMPLE 1

A laminated sheet suitable for use as a packaging material was made by first bonding a 0.00035-inch-thick aluminum foil to a 0.0008-inch film of polyvinylchloride-coated cellophane by a sandwich extrusion technique wherein molten polyethylene was extruded at 575° F. between the coated cellophane film and the aluminum foil with the inner surface of the polyvinylchloride-coated cellophane having first been primed with a thin layer of a polyurethane resin which was the polymerization product of an isocyanate and a polyether. The thickness of the extruded polyethylene layer was 0.0008 inch and the polyethylene employed was characterized with a melt index of 3.0 and a density of 0.918 gram per cc. The coated cellophane sheet was regenerated cellulose which was coated on both sides with a thin coating (about 12 percent of the thickness of the cellulose film) of polyvinylchloride.

Immediately after the first bonding operation, the laminate was then extrusion coated on the exposed foil surface with polyethylene with a 0.002-inch layer of the material being applied.

A flexible pouch was constructed from two sheets of laminated film prepared in the above manner by superimposing the faces of the outer polyethylene layers of the sheets and then heat-sealing the edge areas of the assembly at a temperature of 325° F.

The pouch was then stored at ambient conditions for 1 month.

The resistance of the laminated sheet to delamination in the heat-sealed and nonheat-sealed areas of the pouch was determined by measuring the bond strength between the polyvinylchloride-coated cellophane and the inner polyethylene layer of the laminate by pulling the bonded layers apart at an angle of 180° to the bond in the opposing jaws of a Suter tensile testing device at the rate of 20.0 inches per minute using test strips 1-inch wide which had been cut out of a heat-sealed section of the pouch, as well as a section of the pouch which had not been subjected to heat-sealing temperatures.

For purposes of comparison, the bond strengths of other laminated sheets prepared in a manner similar to example 1 with the exception that cellophane films which were not coated with polyvinylchloride were bonded to the polyethylene/aluminum foil/polyethylene base laminate with a primer not of the polyurethane variety.

The first of these control films designated Control Film 1 is a cellophane film which is uncoated on the side which is laminated to the polyethylene layer and coated with a coating of nitrocellulose on the opposite side. The cellophane film was bonded to the polyethylene inner layer which had been coated with a thin primer layer of polyethyleneimine.

The second of the control films designated Control Film 2 was a cellophane film which was coated on opposite sides with polyvinylidene chloride and bonded to the inner polyethylene layer with an alkyl titanate primer.

The bond strengths of the various laminates are summarized in table I below.

TABLE I

| Test No. | Laminated Film | Bond Strength (grams/inch width) | |
|---|---|---|---|
| | | unsealed section of pouch | heat-sealed section of pouch |
| 1 | A* | 535 | 370 |
| 2 | B** | 450 | 470 |
| 3 | Control Film 1 | 40 | 40 |
| 4 | Control Film 2 | 80 | 80 |

*SHAWNAD 92; **ADCOTE 335 —isocyanate/polyether polyurethane resins manufactured by Morton Chemical Company, used as primer for bonding cellophane to polyolefin layer.

EXAMPLE 2

The procedure of example 1 was repeated with the exception that on the face of the coated cellophane film to be laminated to the inner polyethylene substrate was printed a reverse design using a variety of different printing inks.

The bond strengths of laminated sheets prepared in accordance with the present invention, as well as the bond strengths of Control Films 1 and 2 which had also been reverse printed with a variety of printing inks, was determined.

The bond strengths of the printed cellophane films to the inner polyethylene layer of the laminate is summarized in table II below.

TABLE II

| Film Type | A | A | B | Control Film 1 | Control Film 2 |
|---|---|---|---|---|---|
| Ink type | vinyl resin | nitro-cellulose-polyamide | acrylic resin-cellulose acetate butyrate | shellac-nitro-cellulose | nitro-cellulose |
| Bond strength (g/in width) | | | | | |
| unsealed section of pouch | 471 | 250 | 770 | 80 | 160 |
| heat-sealed section of pouch | 420 | 110 | 750 | 80 | 40 |

What is claimed is:

1. A laminated heat-sealable sheet comprising a first ply of aluminum foil, a second ply of a polyolefin resin bonded to one face of the aluminum foil, a third ply of a heat-sealable thermoplastic resin bonded to the opposite face of the aluminum foil, and a fourth ply of regenerated cellulose, coated on both sides with a layer of polyvinylchloride, said regenerated cellulose ply bonded to said polyolefin ply with a primer layer of a polyurethane resin.

2. The laminated sheet of claim 1 wherein a decorative design is printed in reverse on one side of the coated regenerated cellulose ply, the regenerated cellulose being bonded to the polyolefin surface of the laminated sheet with said design in contact therewith.

3. The laminated sheet of claim 1 wherein the polyolefin ply is polyethylene.

4. The laminated sheet of claim 1 wherein the heat-sealable thermoplastic resin is polyethylene.

5. A flexible pouch formed of the laminated sheet of claim 1.

* * * * *